(12) United States Patent
Yu et al.

(10) Patent No.: US 6,725,270 B1
(45) Date of Patent: *Apr. 20, 2004

(54) APPARATUS AND METHOD FOR PROGRAMMABLY MODIFYING A LIMIT OF A RETRY COUNTER IN A NETWORK SWITCH PORT IN RESPONSE TO EXERTING BACKPRESSURE

(75) Inventors: Ching Yu, Santa Clara, CA (US); Bahadir Erimli, Campbell, CA (US); Jenny Liu Fischer, Mountain View, CA (US); Peter Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/316,184

(22) Filed: May 21, 1999

(51) Int. Cl.$^7$ .............................................. G06F 15/16
(52) U.S. Cl. ........................................ 709/229; 370/230
(58) Field of Search ................................. 709/235, 229, 709/238; 370/395.71, 412, 229, 448, 445, 230

(56) References Cited

U.S. PATENT DOCUMENTS

| | | | | |
|---|---|---|---|---|
| 5,515,376 A | | 5/1996 | Murthy et al. ............... 370/402 |
| 5,764,641 A | * | 6/1998 | Lin ............................. 370/412 |
| 5,852,723 A | * | 12/1998 | Kalkunte et al. ............ 709/235 |
| 5,854,900 A | * | 12/1998 | Kalkunte et al. ............ 709/238 |
| 6,067,298 A | * | 5/2000 | Shinohara ............... 370/395.71 |
| 6,078,591 A | * | 6/2000 | Kalkunte et al. ............ 370/448 |
| 6,085,248 A | * | 7/2000 | Sambamurthy et al. ...... 709/229 |
| 6,144,636 A | * | 11/2000 | Aimoto et al. ............... 370/229 |
| 6,192,028 B1 | * | 2/2001 | Simmons et al. ........... 370/229 |
| 6,205,153 B1 | * | 3/2001 | Shaffer et al. ............... 370/445 |
| 6,405,258 B1 | * | 6/2002 | Erimli et al. ................ 709/235 |

* cited by examiner

Primary Examiner—Meng-Al T. An
Assistant Examiner—Jungwon Chang

(57) ABSTRACT

A network switch having switch ports for communication of data packets with respective computer network nodes according to CSMA/CD protocol that resets a retry counter for counting data packet transmission attempts within any one of the respective switch ports if backpressure is asserted by that port. A retry limit value for the retry counter is selectively modified according to programmed information to ensure that the total number of retrys does not exceed a maximum total number of allowable retrys. Resetting the retry counter within a port after assertion of backpressure affords the port a greater probability of transmitting earlier under the CSMA/CD protocol, thus more quickly relieving congestion which may occur in the network switch. Selective modification of the retry limit value according to programmed information adds flexibility to vary the maximum total number of allowable retrys based upon current network switch conditions or the priority of a particular data packet.

31 Claims, 11 Drawing Sheets

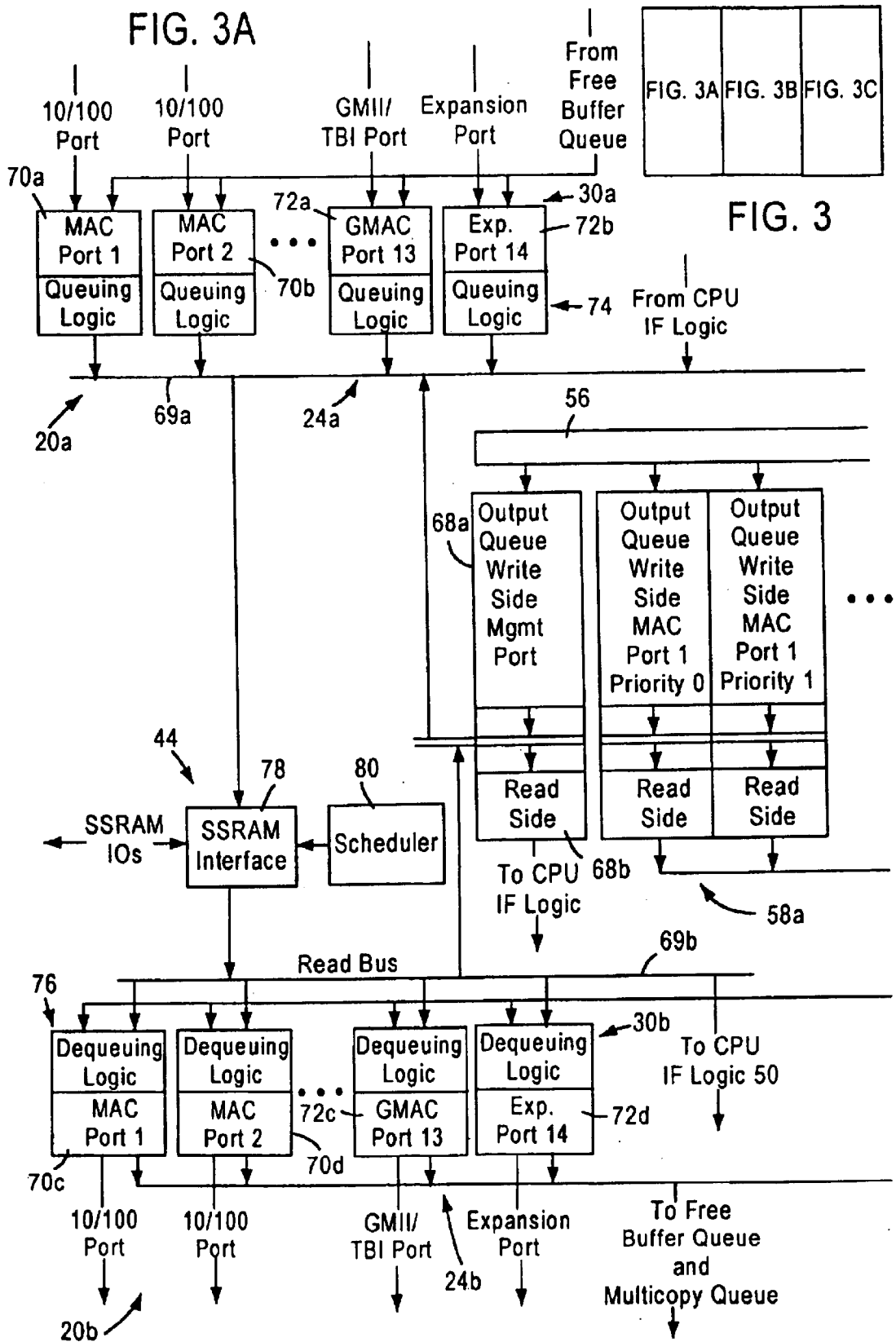

APPARATUS AND METHOD FOR PROGRAMMABLY MODIFYING A LIMIT OF A RETRY COUNTER IN A NETWORK SWITCH PORT IN RESPONSE TO EXERTING BACKPRESSURE

RELATED APPLICATIONS

This application contains subject matter similar to that disclosed in application Ser. No. 09/316,185, filed May 21, 1999, now U.S. Pat No. 6,563,790 entitled APPARATUS AND METHOD FOR MODIFYING A LIMIT OF A RETRY COUNTER IN A NETWORK SWITCH PORT IN RESPONSE TO EXERTING BACKPRESSURE.

BACKGROUND OF THE INVENTION

1. Field of the Invention

The present invention relates to computer network interfacing and switching and, more particularly, to an apparatus and method for controlling a network switch port operating in a half-duplex mode.

2. Background Art

Local area networks use a network cable or other media to link stations on a network. Each local area network architecture uses a media access control (MAC) enabling network interfaces at each station to share access to a medium. The Ethernet protocol (IEEE/ANSI Std. 802.3) defines a half-duplex media access format that permits all stations to access the network media channel with equality. Traffic is not distinguished or prioritized over the media. Each station includes an Ethernet interface that uses carrier-sense multiple-access with collision detection (CSMA/CD) to listen for traffic on the media. Any station can attempt to contend for the channel by waiting a predetermined transmission delay interval after the deassertion of the carrier on the media, known as the interpacket gap (IPG) interval. If a plurality of stations have data to send on the network, each of the stations will attempt to transmit in response to the sensed deassertion of the carrier on the media and after the IPG interval, resulting in a collision. Hence, a transmitting station will monitor the media to determine if there has been a collision due to another station sending data at the same time. If a collision is detected, both stations stop, wait a respective random amount of time, and retry transmission.

Ethernet networks mediate collisions by using a truncated binary exponential backoff (TBEB) algorithm, that provides a controlled pseudo-random mechanism to enforce a collision backoff interval before retransmission is attempted. According to the truncated binary exponential backoff algorithm, a station counts the number of transmission attempts (k) during the transmission of a current frame using a counter, referred to as a "retry counter". The station computes a collision backoff interval as a randomized integer multiple of a slot time interval, and attempts retransmission after the collision backoff interval. The station will attempt to transmit under the truncated binary exponential algorithm until a retry limit value ($k_{max}$) has been reached. Under the Ethernet standard (IEEE/ANSI Std. 802.3), the limit for attempting transmission of a particular data frame is sixteen (16) times. If the station unsuccessfully attempts transmission of a data frame sixteen times, the data frame is then discarded by the station.

The collision backoff interval is calculated by selecting a random number of time slots from the range of zero to $2^k$. For example, if the number of attempts is k=3, then the range of randomly selected integer multiples is (0,8); if the randomly-selected integer multiple is four, then the collision backoff interval will be equal to four slot time intervals. According to Ethernet protocol, the maximum range of randomly selected time slots is from zero to $21^{10}$.

The truncated binary exponential algorithm has the disadvantage that the range of randomly selected integer multiples $(0, 2^k)$ increases exponentially each time a specific station unsuccessfully attempts a retry transmission after collision (i.e., the count k is increased), resulting in a higher probability that during the next collision mediation the station will randomly select a larger integer multiple of time slots, thereby decreasing the probability that the station will gain access to the media on the next retry transmission. Thus, a new station that has data to transmit has a higher probability of gaining access to the media than the station having a greater number of attempts. This effect is known as the "capture" effect, where a new station in the collision mediation effectively has a greater probability of capturing access to the media than the station attempting capture prior to the new station.

Hence, collision mediation may reduce the network throughput and create packet access latencies. Consequently, the capture effect causes a large variance in the network access latency, and a corresponding large variance in end to end delays experienced by data packets.

Additionally, network stations generally do not have knowledge of the status of other stations on the network. If there is no collision, a transmitting station will transmit the data packet regardless of the state of the receiving station. If the receiving station is in a state of congestion, for example due to a lack of buffer space, the receiving station will discard the transmitted packet, resulting in a loss of data. If upper layer protocol requires the data to be resent, the sending station will resend the data packet at a later time, reducing the network throughput and efficiency.

Network congestion occurs if a receiving network element is unable to receive data at a rate greater than or equal to the transmission rate of the transmitting element. For example, traffic in a client-server environment is dominated by client requests followed by a burst of frames from the server to the requesting client. Although the full duplex environment enables the server to transmit packets while receiving requests from other clients, only a limited number of client requests can be output to the server from the switched hub at the assigned switching port. If the number of client requests exceeds the capacity of the server's buffer, some of the data packets will be lost. Alternatively, a client having limited buffer space may be unable to keep up with the transmission rate of the server, resulting in lost packets.

Flow control has been proposed to reduce network congestion, where a receiving station causes a sending station to temporarily suspend transmission of data packets. A proposed flow control arrangement for a half duplex environment, referred to as "backpressure" directs a receiving station to force a collision with the transmitting station by transmitting a jamming sequence of bits when the receive buffer of the receiving station reaches a "receive buffer unavailable" state. This state occurs when the receive buffer of the receiving station is queuing data packets at a rate exceeding the rate at which the buffer is capable of subsequently emptying to another station receiving the data packets (i.e., transmitting).

FIG. 8 illustrates the use of backpressure by a port 202 within a network switch 200 operating in half-duplex mode according to the CSMA/CD protocol. Port 202 receives and transmits data packets in communication with a network station 204 via a network media 206. If the port 202 is unsuccessful in transferring a data packet from its transmit buffer to the network station 204 over the media 206 due to collisions, the port 202 will backoff and wait a randomly selected period of time before retransmitting according to the CSMA/CD protocol. After each transmission attempt, the retry counter within the port is incremented. As discussed previously, as the number of retrys attempted by the transmitting port increases, the likelihood of that port gaining access to the media decreases.

Additionally, during the backoff interval, the receive buffers in port 202 may become active and start to receive a data packet 216 transmitted from network station 204. Should the receive buffers in the port 202 become overloaded due to congestion of the network switch bus 208 or other network ports 212, for example, the network switch engine 210 detects that the receive buffers of port 202 have become overloaded and directs the port to assert a backpressure jamming sequence 218, causing network station 204 to backoff and wait a randomly selected period of time before attempting retransmission. Under the CSMA/CD protocol, the collision forced by the jamming sequence causes the transmitting network station 204 to abort, jam and retransmit a data packet after the collision backoff interval. Thus, the asserted "backpressure" controls the input port congestion of station 202 by forcing the sending network station 204 to invoke the truncated binary exponential backoff (TBEB) algorithm under the CSMA/CD protocol. Consequently, the TBEB algorithm causes the sending station 204 to stop transmission and wait to retransmit when the collision backoff interval is complete. During the backoff interval, the congested port 202 is given time to unload its internal receive buffers. If the port 202 remains congested, additional backpressure is asserted onto network station 204 to attempt to further alleviate the port congestion.

Conditions giving rise to the assertion of backpressure by a port 202, such as congestion within the switch 200 and other ports 212 can cause degradation of the switch performance. In addition, a higher retry count value in ports asserting backpressure can lead to further performance degradation since these ports are less likely to gain access to the media. Hence, data packets awaiting retransmission remain in the transmit buffers for longer periods of time due to lost collision mediation, thereby aggravating the congestion in the switch.

SUMMARY OF THE INVENTION

There is a need for an apparatus and method for controlling a network switch port that provides the port a greater probability of gaining access to a media during collision mediation following the assertion of backpressure by that port. There is also a need to selectively adjust a maximum allowable number of retry attempts (i.e., the limit value) for a given data packet as determined by a user or by predetermined programmed information.

These and other needs are attained by the present invention, where the retry counter of a network switch port is reset upon assertion of backpressure by the port. If the retry count value k is reset one or more times, however, the total number of retry attempts may exceed a desirable maximum allowable number as prescribed by a user or industry standard (e.g., the Ethernet standard of 16). This overstep of the maximum number occurs because the retry count k is normally compared against an initial set value of $k_{max}$ to determine when the maximum number is reached. Thus, since k may be reset once or more, the actual total number of retry attempts may exceed the set retry limit value $k_{max}$. Thus, an adjustment of the retry limit value taking into account the actual total number of retrys becomes necessary to ensure that the desired retry limit value is not exceeded. Additionally, conditions present in the network switch, such as heavy congestion, may present situations where it is desirable to further adjust the retry limit value up or down to help further alleviate switch congestion. Hence, the present invention further selectively adjusts the value of the retry limit value ($k_{max}$) with each retry counter reset and in dependence upon certain programmed conditions.

According to one aspect of the invention, a network switch in a computer network includes a plurality of ports configured for transferring data packets over the computer network. At least some of the network switch ports have a retry counter incrementing a retry count of the number of occurrences that a respective port attempts and fails to transfer a data packet over the computer network. The retry count of the retry counter has a retry limit value corresponding to a maximum number of times the respective port is allowed to attempt transfer of an individual data packet. In keeping with the CSMA/CD protocol, control logic is included for discarding the individual data packet in response to the retry count in the retry counter reaching the retry limit value. Furthermore, these network switch ports include a retry counter reset for resetting the count of the retry counter to a start value when a backpressure data sequence is asserted by the port onto the computer network. The retry counter reset affords the port a greater probability of gaining access to the media during collision mediation when the ports are attempting to transmit a data packet after backpressure assertion. Providing greater probability of gaining access to the media serves to help relieve congestion that may be occurring in the network switch.

In addition, the ports include a programmable retry limit modification logic that selectively modifies the retry limit value based on programmed information. The programmable retry limit modification logic is called upon to modify the retry limit value after each assertion of backpressure by the port to ensure that the total number of transfer attempts for any one individual data packet does not exceed a maximum total number of transfer attempts for the individual data packet. Additionally, selective modification of the retry limit value according to programmed information allows flexibility to either increase or decrease the maximum total number of transfer attempts responsive to current network switch conditions to help alleviate congestion in the switch.

According to another aspect of the invention, a method for controlling a port of a network switch in a computer network includes incrementing a count in a retry counter within the port each time the port attempts and fails to transfer a data packet over the computer network. The count of the retry counter has a retry limit value corresponding to a total number of times the respective port is allowed to attempt transfer of an individual data packet. In addition, the method includes sensing whether the port transmits a backpressure sequence of bits over the computer network. If exertion of backpressure is sensed, the count in the retry counter is reset to a start value. Further, the retry limit value of the count is selectively modified according to preprogrammed information each time the count is reset such that the total number of transfer attempts for an individual data packet does not exceed a maximal total retry limit value determined based on the preprogrammed information. Selectively modifying the retry limit value according to preprogrammed information allows flexibility to either increase or decrease the maximum total number of transfer attempts responsive to current network switch conditions to help alleviate congestion in the switch.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

FIG. 3 3A–3C is are back diagrams illustrating in detail the switching subsystem of FIG. 2.

DETAILED DESCRIPTION OF THE INVENTION

Switch Architecture Overview

Figure 1:
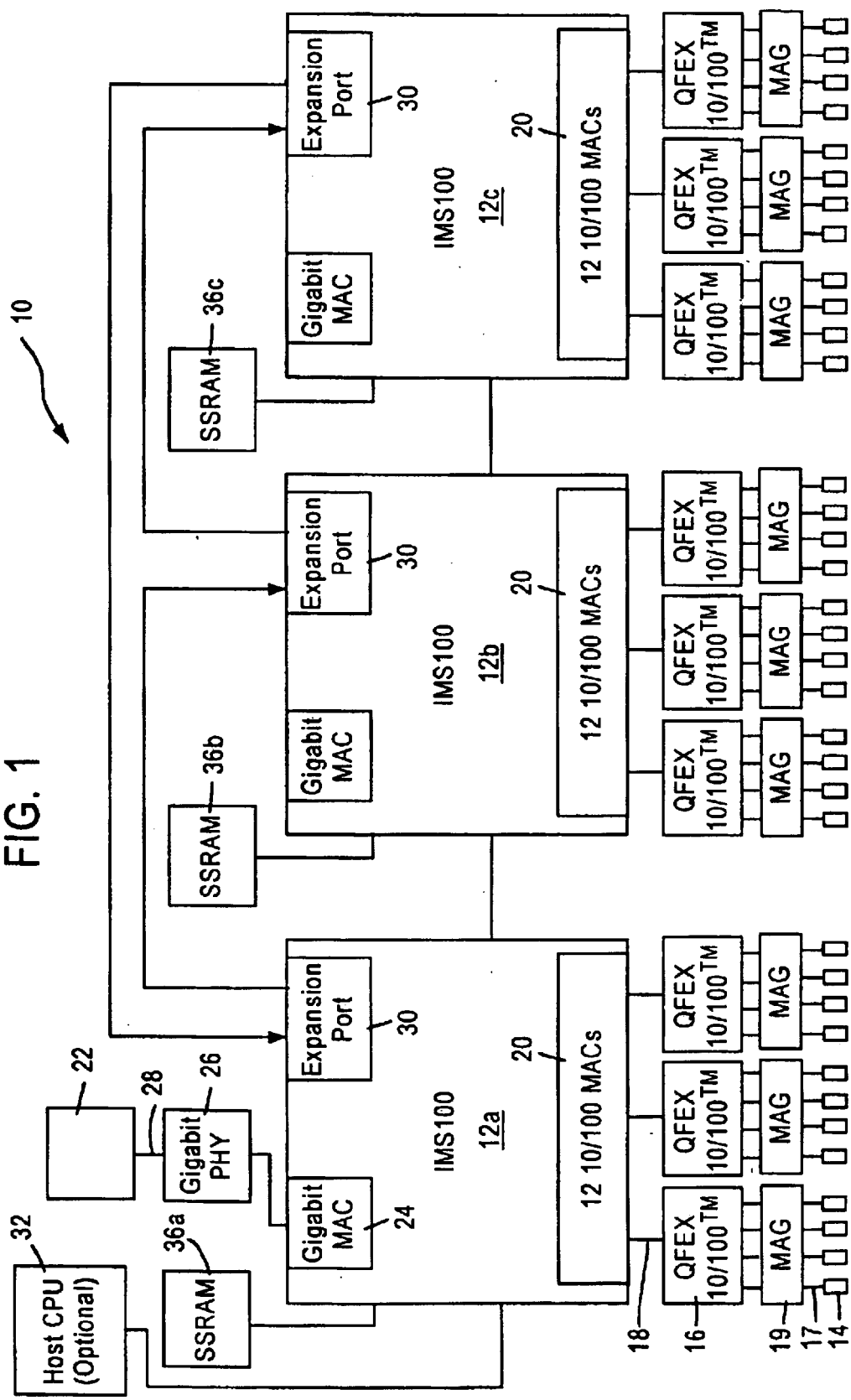
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3µ protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISOIIEC 8802-3 (ANSI/IEEE Std. 802.3,1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3µ. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
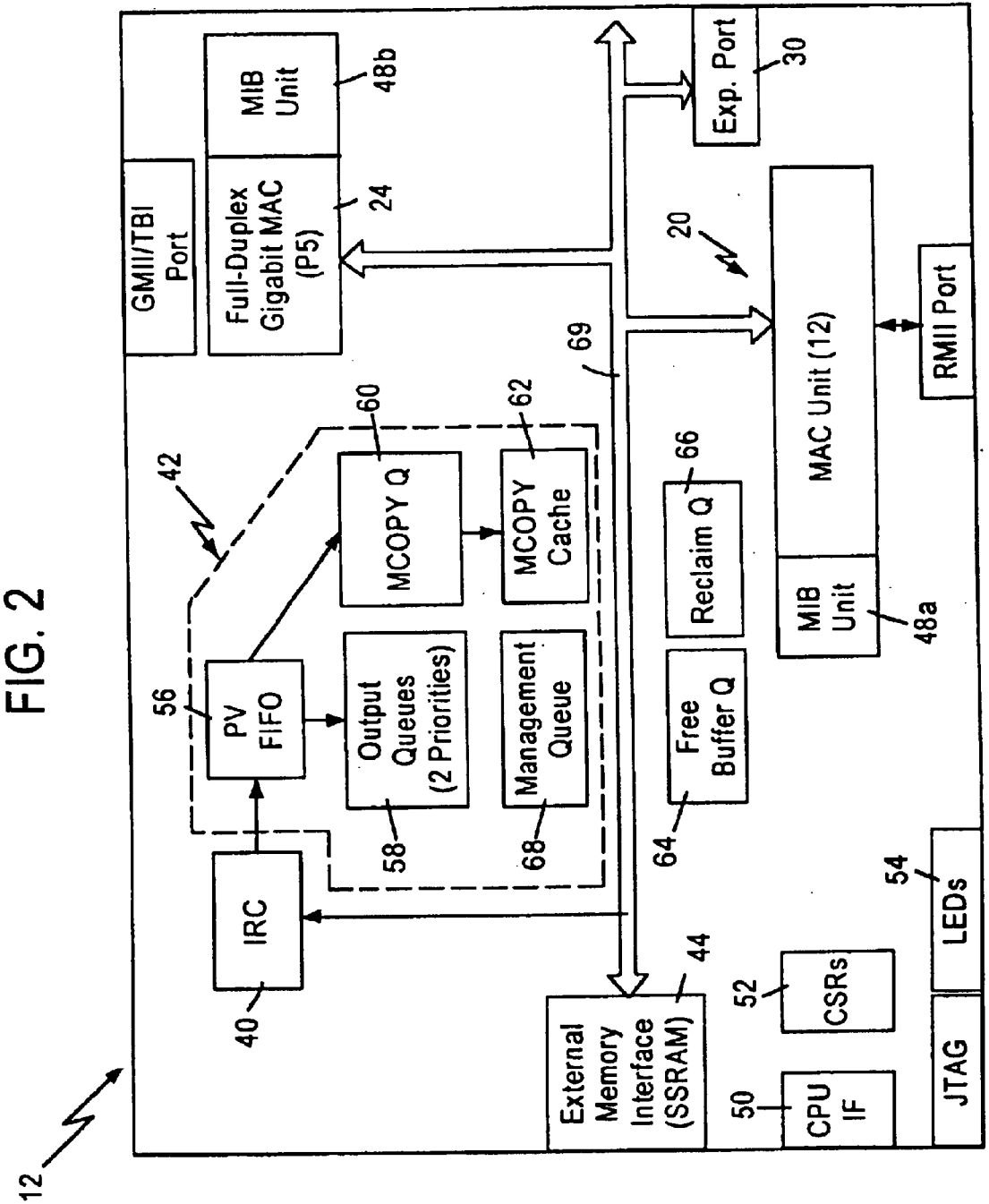
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops" the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

Figure 3B:
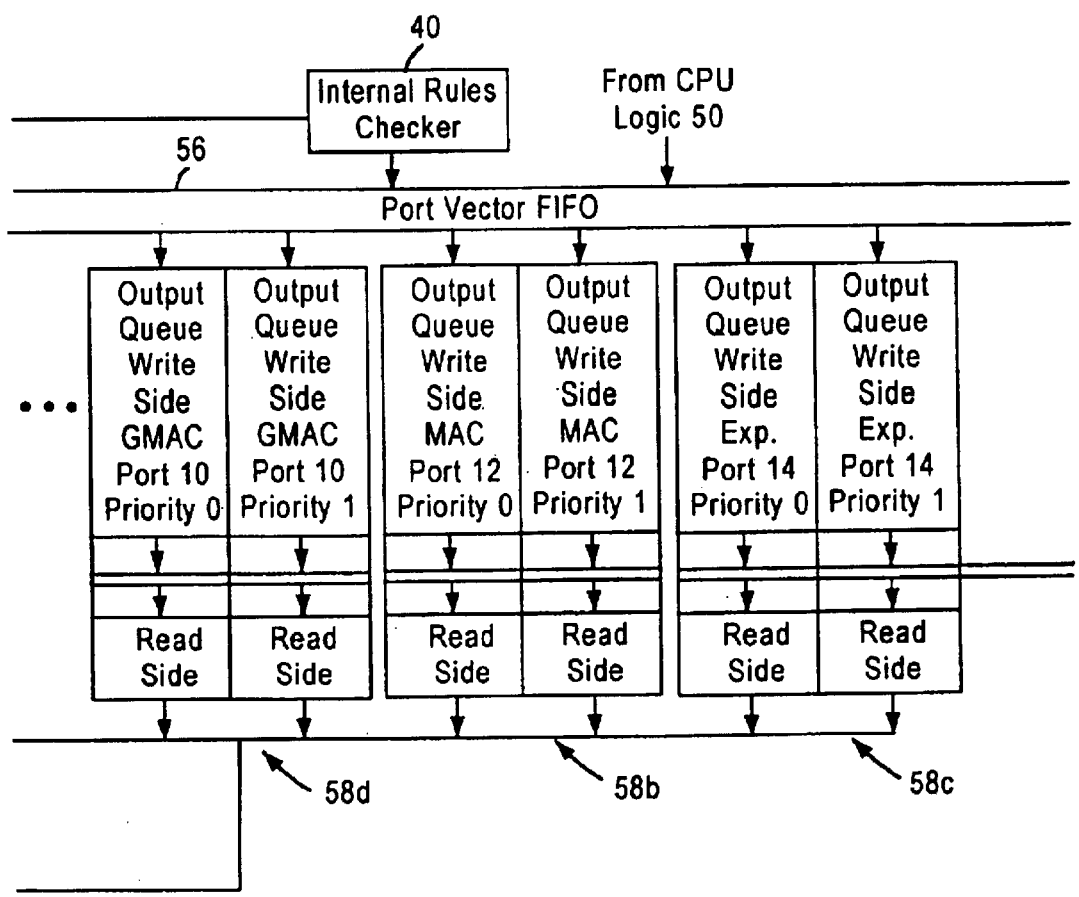
Figure 3C:
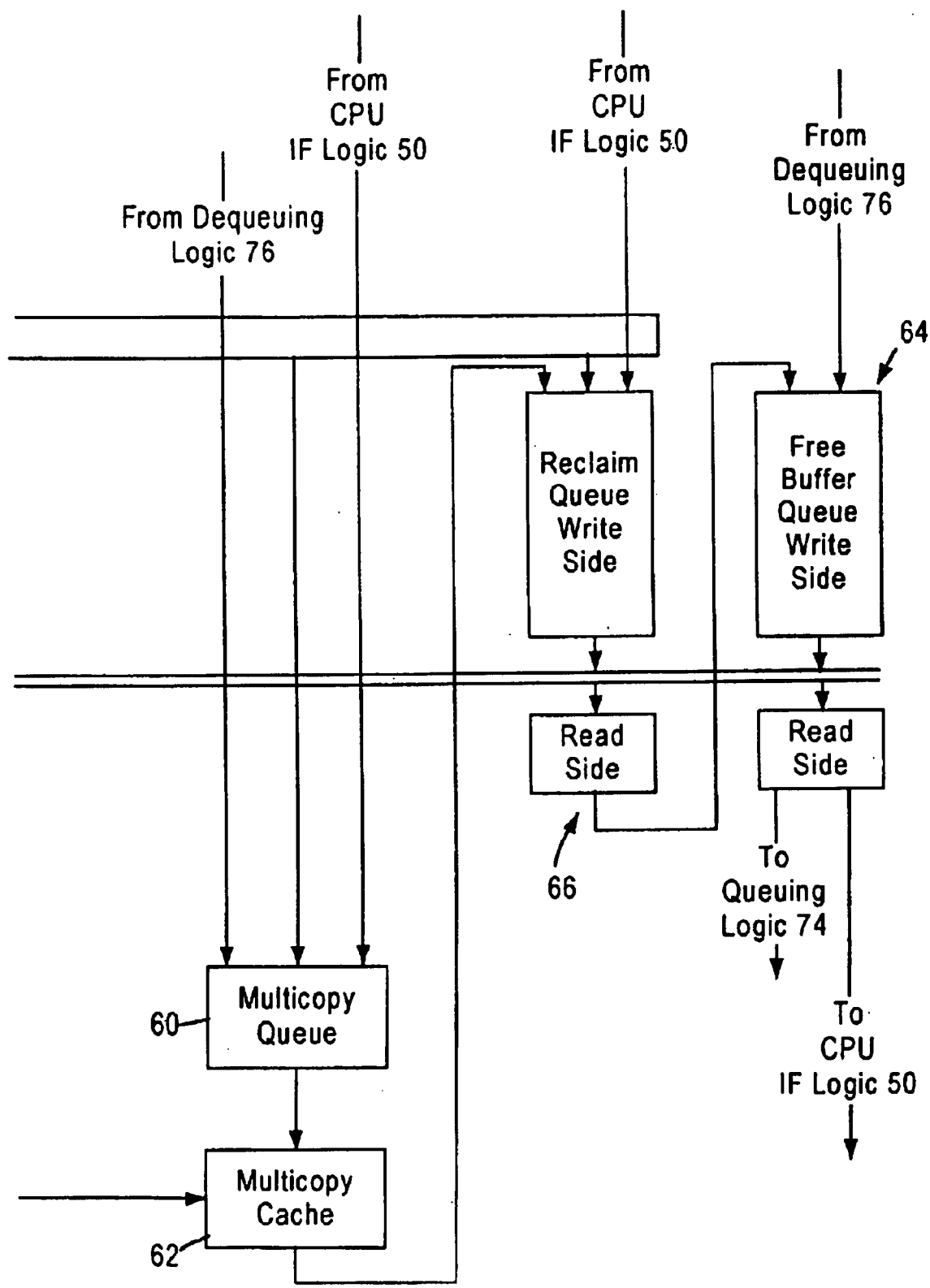

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

FIG. 3, 3A–3C depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIGS. 3, 3A–3C each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the configuration of an exemplary port MAC will be discussed, followed by the details for performing reset of the retry counter within the port MAC.

Retry Counter Reset with Retry Count Limit Modification

Figure 4:
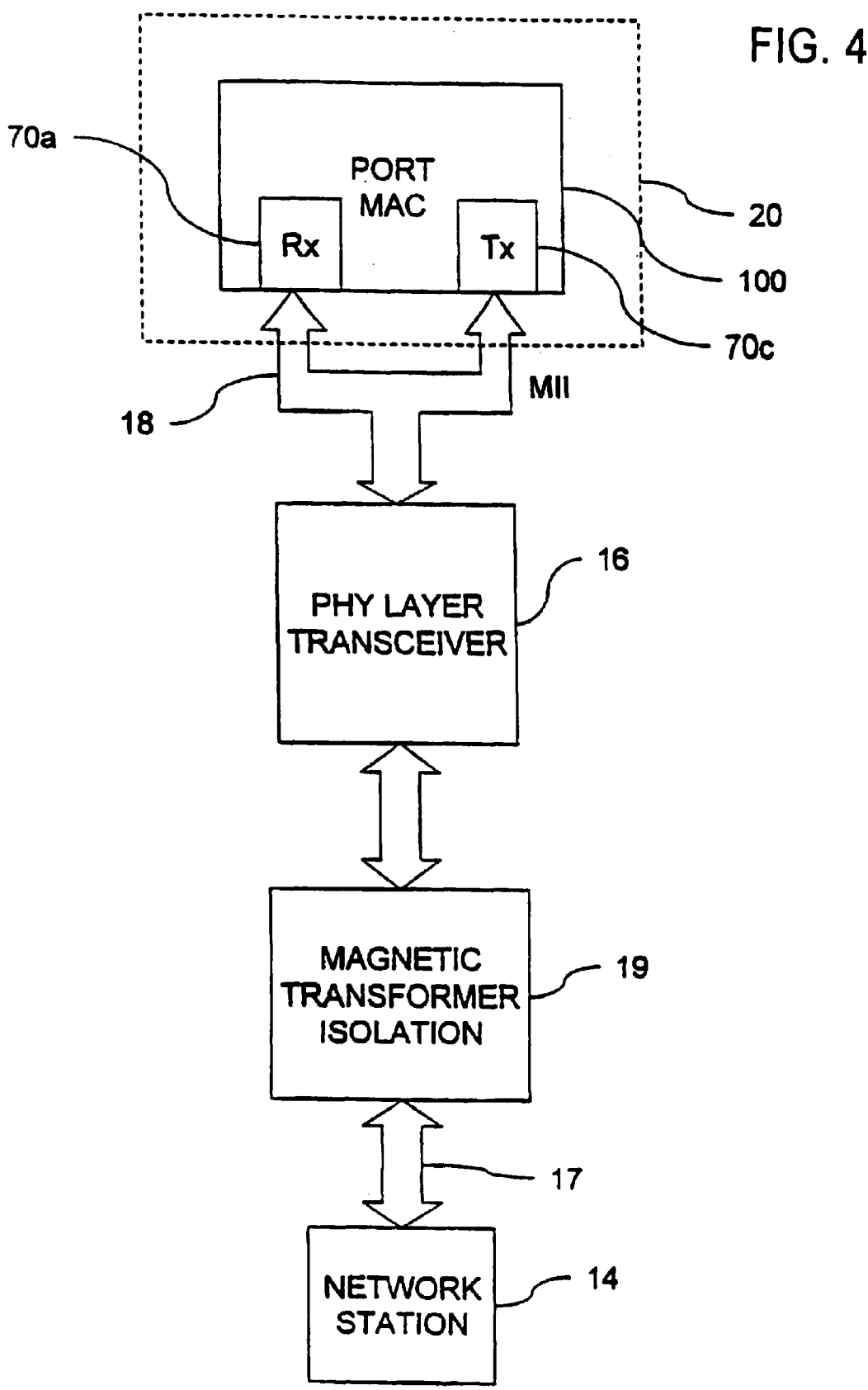
FIG. 4 is a block diagram of a single port system according to an embodiment of the present invention.

FIG. 4 illustrates the configuration of a single port within network switch 12. The MAC unit 20 includes a single port MAC module 100 including the MAC receive portion 70*a* and the MAC transmit portion 70*c*. MAC receive portion 70*a* and MAC transmit portion 70*c* are connected to the RMII 18 which interfaces with the physical layer transceiver 16. A magnetic isolation transformer 19 electrically isolates the physical layer transceiver 16 from the Ethernet medium 17 which connects the port MAC module 100 to a network station 14.

Figure 5:
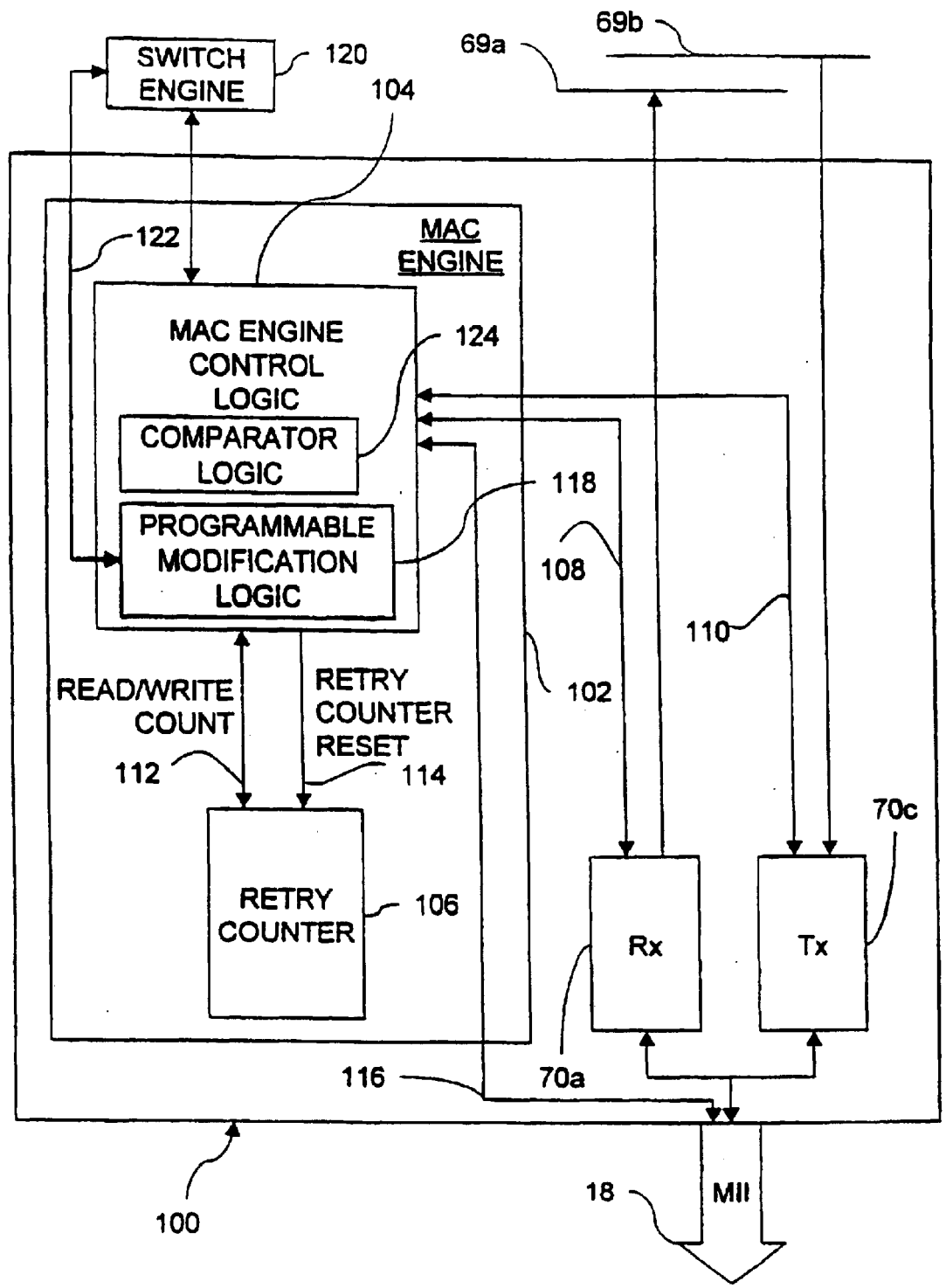
FIG. 5 is a block diagram illustrating in detail the port MAC of FIG. 4.

FIG. 5 illustrates the port MAC module 100 in more detail according to an exemplary embodiment of the present invention. Other elements of the network switch 12 illustrated in FIGS. 2 through 4 are reproduced in FIG. 5 to illustrate the connections of the port MAC module 100 to these other elements.

As shown in FIG. 5, the port MAC module 100 includes a MAC engine 102 controlling the operation of the port MAC module 100. Included within the MAC engine 102 is MAC engine control logic 104 in communication with a network switch engine 120. In certain embodiments, the network switch engine 120 may be comprised of the host CPU 32 communicating to the MAC engine control logic 104 via the CPU IF 50 and the internal rules checker 40. In addition, the MAC engine 102 includes a retry counter 106 that counts the number of data packet transmission attempts by the transmit portion 70*c* of the port MAC module 100. The MAC engine control logic 104 is in communication with the receive portion 70*a* and the transmit portion 70*c* via connection lines 108 and 110, respectively. Communication with the transmit portion 70*c* over line 110 enables the MAC engine control logic 104 to determine when the transmit portion 70*c* is attempting to transmit a data packet and whether or not the transmission attempt is successful. Further, communication via connection 110 enables the MAC engine control logic to direct the transmit portion 70*c* to discard a data packet when a maximum retry limit value $k_{max}$ has been reached. Communication via line 108 with the receive portion 70*a* allows the MAC engine control logic 104 to determine if the receive portion 70*a* is in a state of congestion. The MAC engine control logic 104 also receives instructions from the switch engine 120 to initiate functions such as the assertion of backpressure by the transmit portion 70*c* via line 110.

The MAC engine control logic 104 generates a signal and transmits it via link 114 for resetting the retry counter 106. In addition, link 112 is used to simultaneously increment the retry counter 106 each time the transmit portion 70*c* attempts and fails to transmit a data packet. Further, the MAC engine control logic 104 reads the value of the retry counter 106 via link 112 to determine the present value of the count (i.e., k).

Included within the MAC engine control logic 104 is programmable modification logic 118 capable of modifying the retry limit value (i.e., $k_{max}$) for any particular data packet and comparator logic 124 for comparing the retry limit value to a current retry count value of the retry counter. Specifically, the programmable modification logic 118 selectively adjusts the retry limit value to ensure that the total number of retrys for a particular data packet does not exceed a maximum number of retrys determined by programmed information received from the switch engine 120, even though the retry counter 106 may be reset to zero once or more during the time which the data packet is awaiting transmission. In certain embodiments, the programmable modification logic 118 is implemented by a summation device that subtracts the current retry count value k from the current maximum number of retrys $k_{max}$ to derive a new value for $k_{max}$. The comparator logic 122 compares the current retry limit value with a current retry count value of the retry counter to determine whether a total maximum number of transfer attempts as determined by the switch engine 120 in concert with the programmable modification logic 118 has been reached.

As mentioned above, the programmable modification logic 118 receives programmed information from the switch engine 120 via line 122. The programmed information contains information concerning conditions for a particular data which is used to either selectively increase or decrease the retry limit value. In particular, this information is utilized by the programmable modification logic 118 to either add or subtract to the value of $k_{max}$ in order to respectively increase or decrease the maximum number of retrys (i.e., $k_{max}$) dependent upon the specific programmed information. The method performed by the MAC engine control logic 104, including the programmable modification logic 118 and comparator logic 124 will be described below with reference to FIGS. 6, 7A and 7B.

Figure 6:
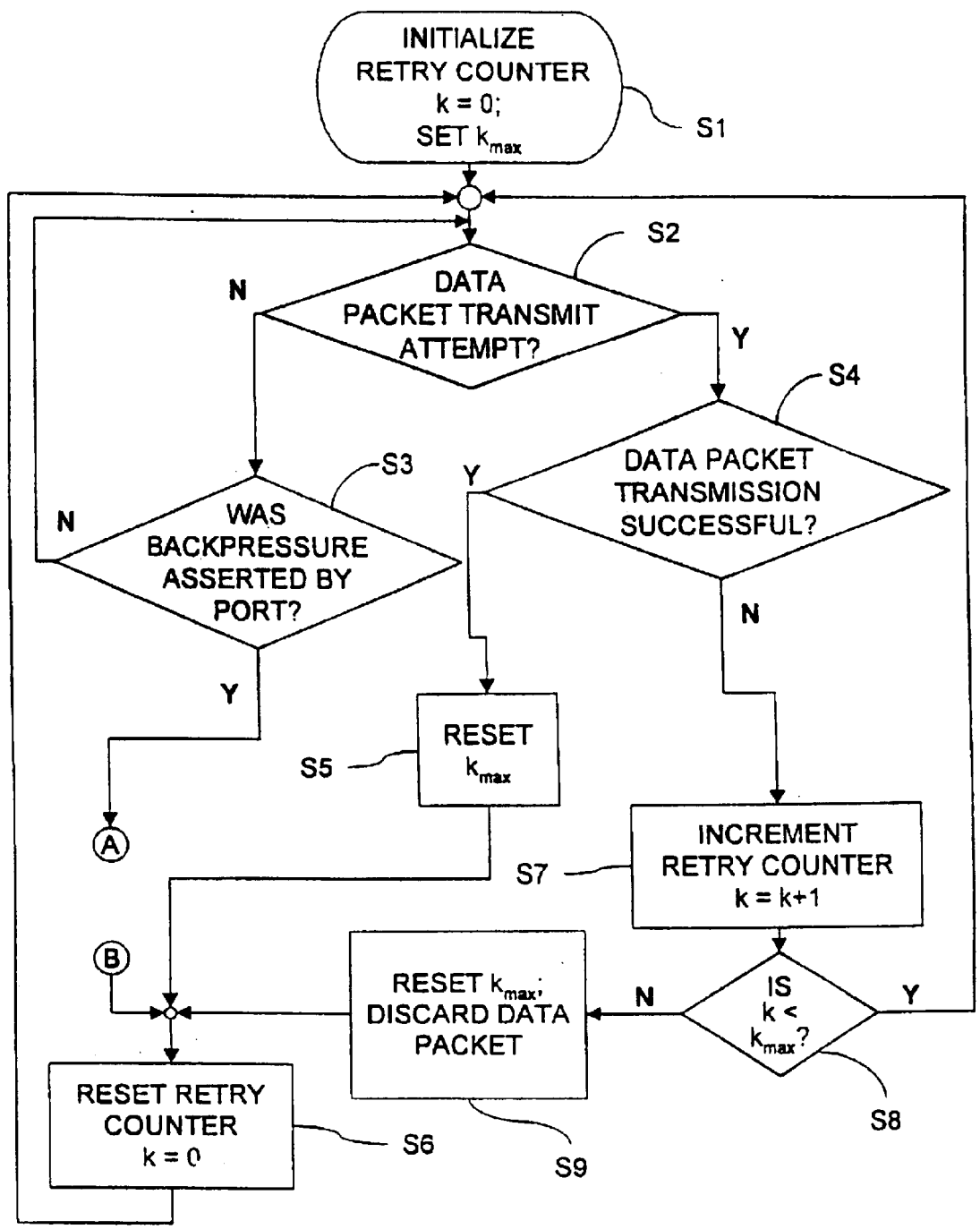
FIG. 6 is a flow diagram of the MAC engine control logic according to an embodiment of the present invention.

FIG. 6 illustrates a flow diagram of the method followed by the MAC engine control logic 104, including the programmable modification logic 118 and comparator logic 124 according to an exemplary embodiment of the present invention. In step S1, the MAC engine control logic 104 initializes the retry counter 106 to a count value of k=0 and the programmable modification logic 118 sets $k_{max}$ at a predetermined value, normally 16. At step S2, the MAC engine control logic 104 senses over link 110 whether the transmit portion 70*c* is currently attempting to transmit a data packet. If a data packet is not currently being transmitted, the control logic 104 proceeds to step S3 to then determine whether or not backpressure was exerted by the transmit portion 70*c* of the MAC port module 100.

In this particular embodiment, the assertion of backpressure may occur during the period in which the transmit portion 70*c* is backed off due the invocation of the CSMA/CD protocol. Specifically, upon transmission failure, the MAC engine control logic 104 senses via link 116 that a collision has occurred and initiates the CSMA/CD protocol, directing the transmit portion 70*c* to backoff a random period of time under the TBEB algorithm. During the backoff interval, should the switch become congested the switch engine 120, in turn, initiates a signal to the MAC engine control logic 104 to assert backpressure via the transmit portion 70c of the MAC port 100. The transmit portion 70c issues the backpressure sequence of bits over the RMII 18 to the sending network station 14. This backpressure, in turn, causes the sending network station 14 to backoff under the CSMA/CD protocol, thereby enabling the switch to clear the congestion.

Accordingly, if no backpressure was asserted by the port, the MAC engine control logic loops back and continues to monitor whether the transmit portion 70c is attempting transfer of a data packet at step S2.

Figure 7A:
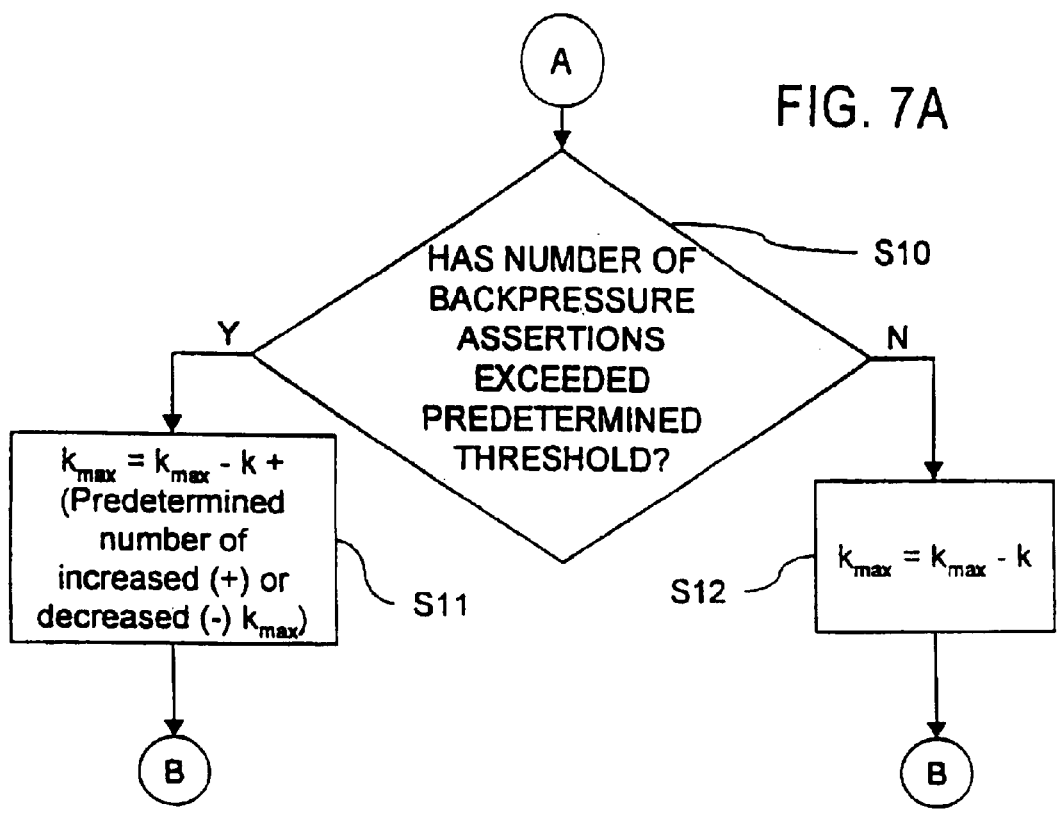
FIG. 7A is a continuation of the flow diagram of FIG. 6 according to an embodiment of the present invention.

On the other hand, if backpressure is exerted by the port MAC module 100 as determined by the MAC control logic 104 in step S3, the programmable modification logic 118 proceeds to "A" which is continued in FIG. 7A. FIG. 7A illustrates an exemplary embodiment in which programmable modification logic 118 modifies the value of $k_{max}$ based upon the occurrence of a predetermined number of backpressure assertions as directed by the switch engine 120 through the programmed information.

At step S10 in FIG. 7A, the programmable modification logic 118 determines whether the number of backpressure assertions has exceeded a predetermined threshold set by the switch engine 120 and communicated to the programmable modification logic 118 via line 122. If the number of backpressure assertions has exceeded the predetermined threshold, the method proceeds to step S11 for modification of the $k_{max}$ value. At step S11, the programmable modification logic 118 first subtracts the current value k of the retry counter from the current maximum retry value $k_{max}$ in order to account for the resetting of the count k to be subsequently performed in step S6.

As discussed previously, the retry count value k of the retry counter 106 is reset to zero by the MAC control module after the exertion of backpressure by the transmit portion 70c. Under the CSMA/CD protocol, the port MAC module 100 is given a higher probability of winning collision mediation over the media 17 for the data packet awaiting transmission in transmit portion 70c due to a low k value. This is advantageous since faster transmission of the data packet from the port will help alleviate the congestion in the network switch 12 that gave rise to the need for the assertion of backpressure. In other words, if backpressure is needed, the network switch 12 is most likely in a congested state and measures taken to alleviate any sources of congestion (e.g., resetting a retry counter to aid in rapid transmission of a data packet awaiting retransmission) are desirable.

Additionally at step S11, dependent upon the programmed information received from the switch engine 120, the programmable modification logic 118 will add either a predetermined positive integer value (corresponding to an increased number of retrys (i.e., $k_{max}$)) or a predetermined negative integer value (corresponding to an decreased number of retrys) to obtain a new value of $k_{max}$ The programmable modification logic 118 receives the predetermined integer value with the programmed information from the switch engine 120. The method then proceeds to point "B"continued in FIG. 6.

If the number of backpressure assertions has not exceeded the predetermined threshold as determined at step S10, the programmable modification logic 118 will subtract the current count value k from the current maximum retry value $k_{max}$) in step S12 to account for the reset of count k as discussed previously. The method then proceeds to "B" continued in FIG. 6. At point "B" in FIG. 6, the flow proceeds to step S6 where the retry counter k is reset to a start value (i.e., zero) and the method returns to step S2.

As an example of this embodiment, it is assumed that the switch engine 120 sets the predetermined threshold at a relatively high number of backpressure assertions (e.g., 3). A high predetermined threshold might be selected based on the probability that a high number of backpressure assertions would indicate the network switch is most likely in a very congested state. Accordingly, the predetermined integer value added in step S11 could be set at negative 2 (−2), for example, to decrease the maximum number of allowable transmission attempts $k_{max}$ by two attempts. A reduction in the number of allowable transmission attempts would, in turn, reduce the time period during which the data packet must be either successfully transmitted or discarded. This reduction in the time period would serve to help alleviate congestion in the network switch.

On the other hand, the predetermined integer value added in step S11 could be set at a positive value (e.g., +2). This would increase the maximum number of allowable transmission attempts $k_{max}$. Such an increase in transmission attempts could serve to provide a higher probability of transmission to selected higher priority data packets, despite the highly congested state of the network.

Figure 7B:
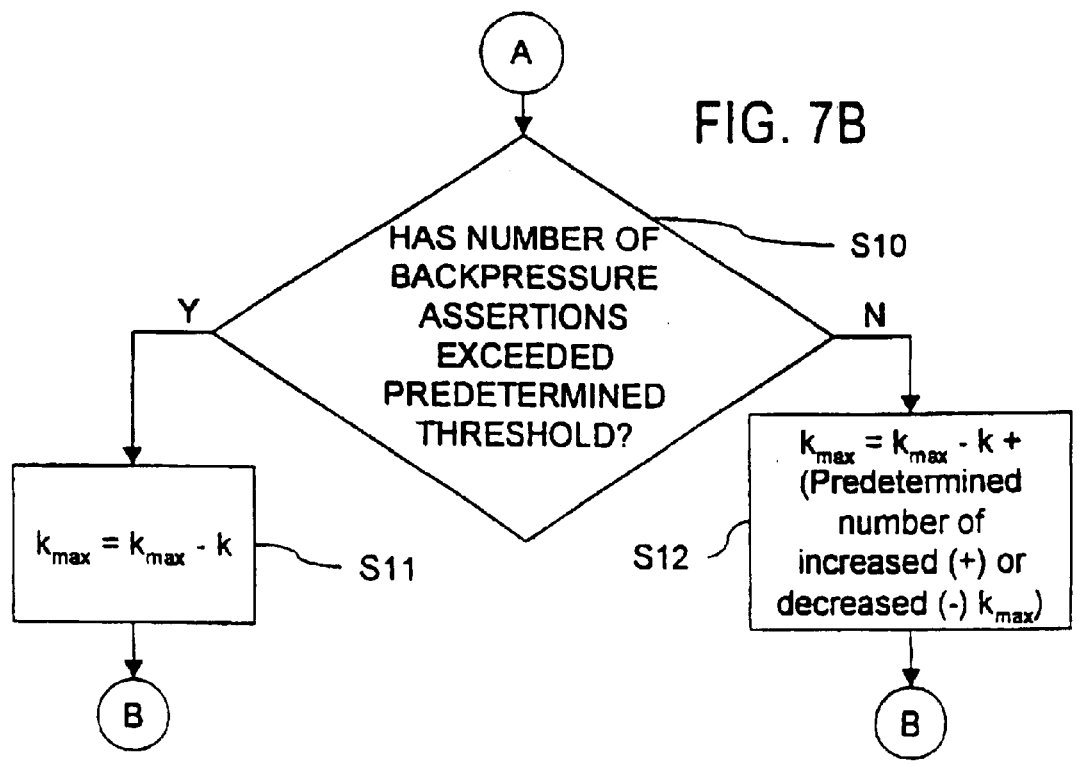
FIG. 7B is a continuation of the flow diagram of FIG. 6 according to an alternate embodiment of the present invention.

An alternate embodiment in which programmable modification logic 118 again modifies the value of $k_{max}$ based upon the number of backpressure assertions is illustrated in FIG. 7B. At step S10 in FIG. 7B, the programmable modification logic 118 determines whether the number of backpressure assertions has exceeded a predetermined threshold as set by the switch engine 120 and communicated to the programmable modification logic 118 via line 122. If the number of backpressure assertions has exceeded the predetermined threshold, the method proceeds to step S11 for modification of the $k_{max}$ value. At step S11, the programmable modification logic 118 subtracts the current count value k from the current maximum retry value $k_{max}$ to account for the subsequent reset of count k, as discussed previously.

If the number of backpressure assertions has not exceeded the predetermined threshold, the method proceeds to step S12 for an alternate modification of the $k_{max}$ value. At step S12, the programmable modification logic 118 first subtracts the current value k of the retry counter from the current maximum retry value $k_{max}$ in order to account for the resetting of the count k to be subsequently performed in step S6. In addition, dependent upon the programmed information received from the switch engine 120, the programmable modification logic 118 will add either a predetermined positive integer value (corresponding to an increased number of retrys (i.e., $k_{max}$) or a predetermined negative integer value (corresponding to an decreased number of retrys) to obtain a new value of $k_{max}$.

As a example of this embodiment, if the switch engine 120 sets the predetermined number of backpressure assertions to a relatively low value, such as one (1), the predetermined number of $k_{max}$ could be set as a positive number to increase the maximum number of retry attempts in step S12. When the number of backpressure assertions remains low, the switch is most likely in a less congested state. However, in this example, when the number of backpressure assertions reaches two or more indicating a higher level of network switch congestion, the programmable modification logic 118 no longer increases the maximum number of retrys, but simply decrements the current $k_{max}$ value by the count k to ensure that the value of the current $k_{max}$, value is not exceeded. Hence, the maximum number of retrys for individual data packets may be increased without significantly exacerbating the network switch congestion so long as the number of backpressure assertions remains low (i.e., the switch is in a less congested state).

Figure 7C:
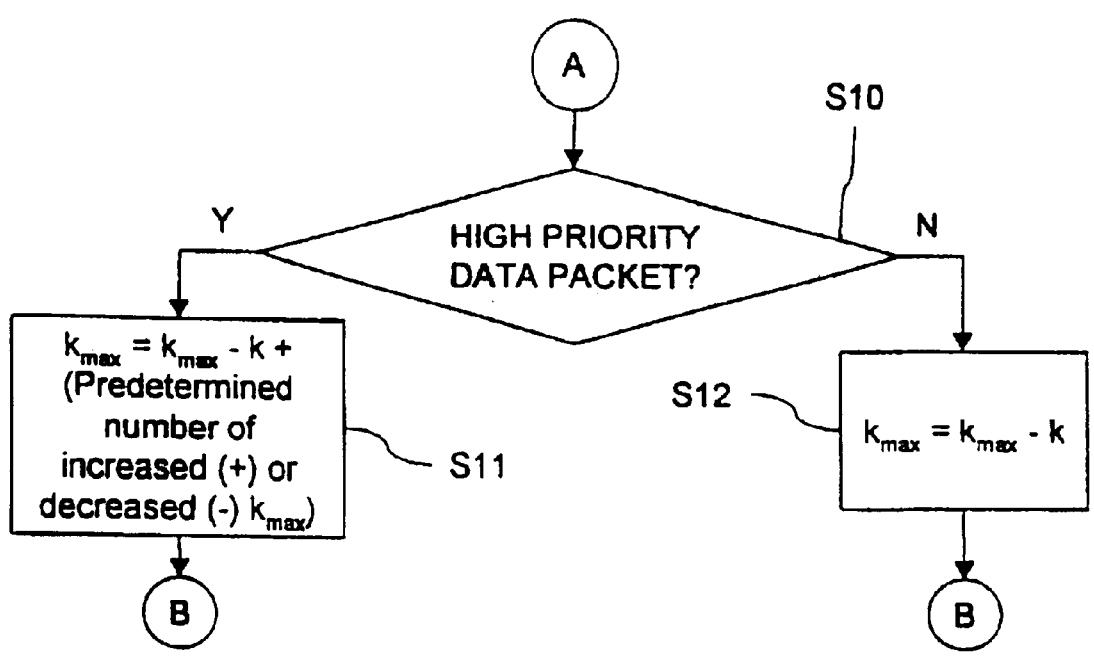
FIG. 7C is a continuation of the flow diagram of FIG. 6 according to another embodiment of the present invention.
Figure 8:
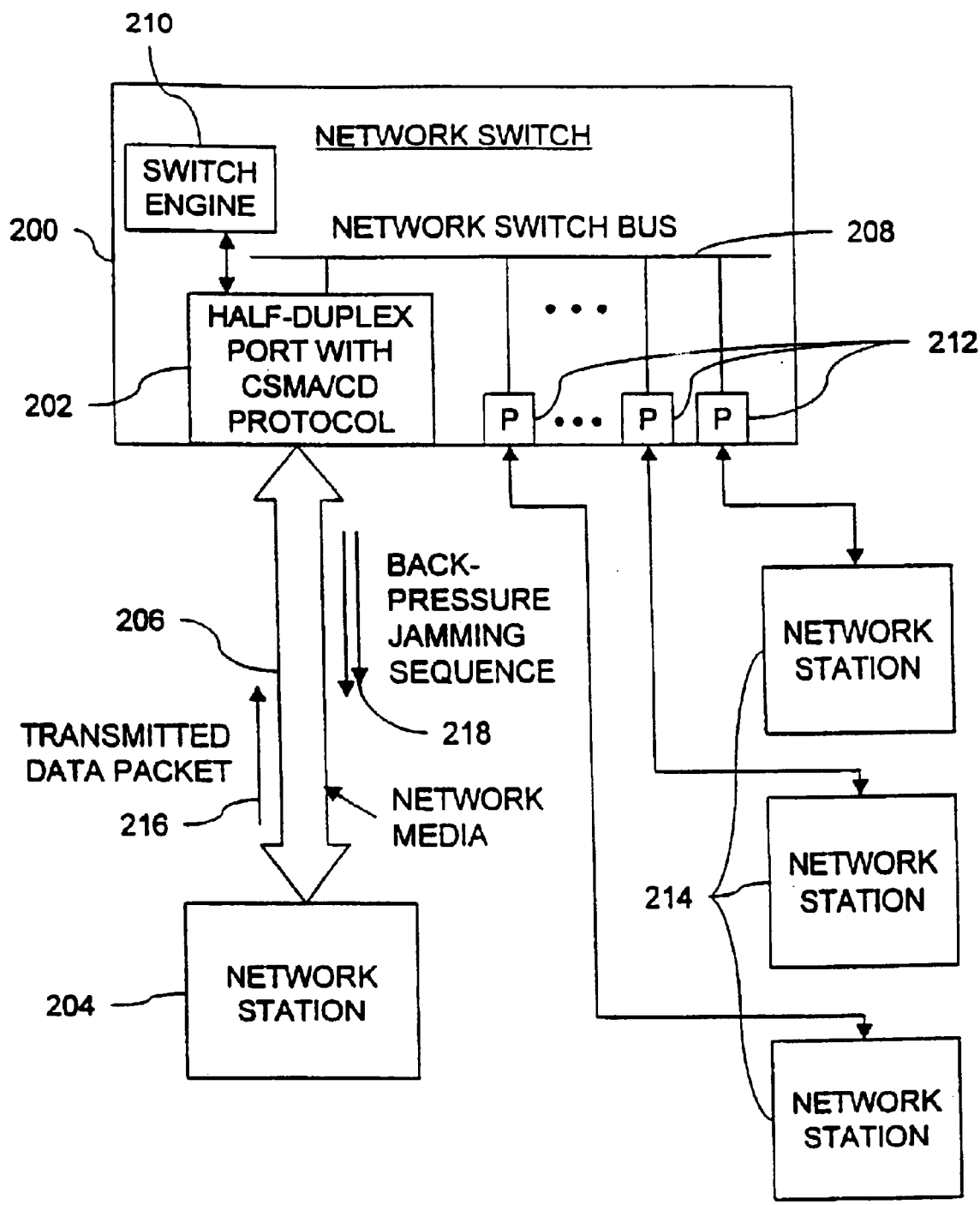
FIG. 8 is block diagram illustrating the use of backpressure signaling in a network switching system.

A further alternate embodiment is illustrated in FIG. 7C in which the programmable modification logic 118 modifies $k_{max}$ based upon programmed priority information received from the switch engine 120 via line 122. In this embodiment, flow proceeds from point "A" in FIG. 6 to step S10 as shown in FIG. 7C. The programmable modification logic 118 then determines whether the data packet awaiting transmission by the MAC port module 100 is a high priority data packet based upon the received programmed priority information. If the data packet is a high priority packet, the programmable modification logic 118 will modify the maximum retry value $k_{max}$) by first subtracting the current retry count value of k from the current value of $k_{max}$ as indicated at step S11. Next, a predetermined integer number of increased attempts is added to increase $k_{max}$. The predetermined integer number of increased attempts is determined by the switch engine 120 based upon the level of priority for each respective data packet. Hence, the present embodiment affords an increased number of transmission attempts to high priority data packets to increase the likelihood that these data packets will be transmitted rather than discarded.

If the data packet is not a high priority data packet, the flow proceeds to step S12 where the programmable modification logic may modify $k_{max}$ by subtracting the current k value from the current $k_{max}$ value to account for the subsequent reset of the count k in step S6. Additionally, for lower priority data packets, the retry limit value $k_{max}$ may also be decreased by subtracting a predetermined integer number of decreased attempts in order to more quickly dispose of lower priority frames through either transmission or discard, affording more time for high priority frames to have an increased number of maximum retry attempts without exacerbating network switch congestion.

If the transmit portion 70c is attempting to transmit a data packet as determined at step S2, the MAC engine control logic 104 then proceeds to determine whether the transmission of the data packet is successful in step S4 shown in FIG. 6. If the data transmission is successful, flow proceeds to step S5 where the MAC engine control logic 104 resets the value of $k_{max}$ in anticipation of the next data packet to be received. Subsequently, flow proceeds to step S6 where the MAC engine control logic 104 resets the retry counter 106 to a value of 0 via link 114.

If transmission of the data packet is unsuccessful as determined at step S4, the MAC engine control logic 104 proceeds to step S7 and increments the retry counter by an integer value of 1 via link 112. If the maximum retry value $k_{max}$ for the particular data packet has not been reached as determined by the comparator logic 124 in step S8, the flow then proceeds back to step S2. Alternatively, if the comparator logic 124 determines that the maximum retry value $k_{max}$ has been reached by the retry counter 106, the data packet in the transmit portion 70c is discarded and the programmable modification logic 118 resets the maximum retry value $k_{max}$ back to the original value (e.g., 16) in anticipation of the next data packet as shown in step S9. Flow then proceeds to step S6 where the MAC control logic 104 resets the count k of the retry counter to a value of 0 and proceeds back to step S2.

Although the disclosed embodiments each illustrate a different criterion for determining the modification of the maximum retry limit $k_{max}$ it will be appreciated that the flexibility of a programmable modification logic 118 would allow two or more of these or other criteria to be used concomitantly.

In the present invention, resetting the retry counter as disclosed by the present invention affords ports in a network switch a greater probability of winning collision mediation when the ports are attempting to transmit a data packet after backpressure assertion. This is advantageous, especially in a congested network switch, since the time to transmit data packets by the network switch ports is reduced, thereby alleviating overall congestion in the network switch. Furthermore, selectively modifying the retry limit value for particular data packets based on programmed information responsive to conditions such as the number of backpressure assertions and the priority level of the data packer adds flexibility and responsiveness to the network switch in appropriate circumstances to help further alleviate network switch congestion.

While this invention has been described as what is presently considered to be the most practical preferred embodiments, it is to be understood that the invention is not limited to the disclosed embodiments, but, on the contrary, is intended to cover various modifications and equivalent arrangements included within the spirit and scope of the appended claims.

What is claimed is:

1. A network switch connected in a computer network comprising:
    a plurality of ports configured for transferring data packets over the computer network; and
    at least some of the plurality of ports including:
        a retry counter incrementing a retry count of the number of occurrences that a respective port attempts and fails to transfer a data packet from the respective port over the computer network, the retry count having a retry limit value corresponding to a maximum number of times the respective port is allowed to attempt transfer of an individual data packet,
        control logic for discarding the individual data packet in response to the retry count in the retry counter reaching the retry limit value,
        a retry counter reset for resetting the retry count of the retry counter to a start value in response to assertion of backpressure by the respective port onto the computer network, and
        programmable retry limit modification logic for selectively modifying the retry limit value based on predetermined programmed information after assertion of backpressure by the respective port.

2. The network switch according to claim 1, wherein the programmable retry limit modification logic is configured to selectively modify the retry limit value to establish a modified retry limit value based on whether a predetermined condition included in the predetermined programmed information is satisfied.

3. The network switch according to claim 2, wherein the control logic includes comparator logic for comparing the modified retry limit value to a current count value of the retry counter to determine whether the current count value has reached the modified retry limit value.

4. The network switch according to claim 3, wherein the control logic discards the data packet when the current count value reaches the modified retry limit value.

5. The network switch according to claim 2, wherein the programmable retry limit modification logic is configured to selectively modify the retry limit value according to a first modification when the predetermined condition is satisfied and a second modification when the predetermined condition is not satisfied.

6. The network switch according to claim 5, wherein the first modification includes subtracting a current count value of the retry counter from a current retry limit value to establish the modified retry limit value and the second modification includes subtracting the current count value of the retry counter from the current retry limit value and adding a predetermined integer value determined according to the predetermined programmed information to establish the modified retry limit value.

7. The network switch according to claim 5, wherein the second modification includes subtracting a current count value of the retry counter from a current retry limit value to establish the modified retry limit value and the first modification includes subtracting the current count value of the retry counter from the current retry limit value and adding a predetermined integer value determined according to the predetermined programmed information to establish the modified retry limit value.

8. The network switch according to claim 2, wherein the programmable retry limit modification logic is configured to selectively modify the retry limit value based upon the predetermined condition including a determination of whether a number of backpressure assertions has exceeded a predetermined threshold value.

9. The network switch according to claim 2, wherein the programmable retry limit modification logic is configured to selectively modify the retry limit value based upon the predetermined condition including a determination of whether the individual data packet is a high priority data packet.

10. A method for controlling a port of a network switch in a computer network comprising the steps of:

incrementing a retry count in a retry counter within the port each time the port attempts and fails to transfer a data packet over the computer network, the retry count having a retry limit value;

sensing whether backpressure is exerted by the port over the computer network;

resetting the retry count in the retry counter to a start value when backpressure is exerted by the port onto the computer network;

selectively modifying the retry limit value of the retry count each time the retry count is reset according to predetermined programmed information such that a total number of transfer attempts for an individual data packet does not exceed a maximal retry limit value determined based on the predetermined programmed the information; and discarding an individual data packet when the retry count has reached the retry limit value.

11. The method according to claim 10, wherein the step of selectively modifying the retry limit value further includes determining whether a predetermined condition based on the predetermined programmed information has been met and selectively modifying the retry limit value dependent on whether the predetermined condition is met.

12. The method according to claim 11, further comprising the step of:

calculating a modified retry limit value according to a first modification calculation when a determination is made that the predetermined condition is met and calculating the modified retry limit value according to a second modification calculation when a determination is made that the predetermined condition has not been met.

13. The method according to claim 12, where in the first modification includes the step of subtracting a current value of the retry count value from a current retry limit value to establish the modified retry limit value and the second modification includes the step of subtracting the current value of the retry count from the current retry limit value and adding a predetermined integer value determined according to the predetermined programmed information to establish the modified retry limit value.

14. The method according to claim 12, wherein the second modification includes the step of subtracting a current value of the retry count from a current retry limit value to establish the modified retry limit value and the first modification includes the step of subtracting the current count value of the retry counter from the current retry limit value and adding a predetermined integer value determined according to the predetermined programmed information to establish the modified retry limit value.

15. The method according to claim 12, further comprising the step of comparing the modified retry limit value with a current value of the retry count to determine whether a number of transfer attempts for the individual data packet has reached the maximal retry limit.

16. The method according to claim 15, further comprising the step of discarding the individual data packet when the current value of the retry count reaches the modified retry limit value.

17. The method according to claim 16, further comprising the step of resetting the retry counter to the start value when the current value of the count reaches the modified retry limit value.

18. The method according to claim 11, wherein the predetermined condition includes whether a total number of backpressure exertions has exceeded a predetermined threshold.

19. The method according to claim 11, wherein the predetermined condition includes whether the individual data packet is a high priority data packet.

20. The method according to claim 10, wherein backpressure is exerted based upon the port queuing data packets at a rate exceeding a port rate at which the port is capable of transmitting data packets.

21. A media access control (MAC) arrangement comprising:

a retry counter that maintains a retry count of the number of failed attempts at transmission of data by a MAC onto a computer network, the retry count having a retry limit value;

control logic that monitors the assertion of backpressure onto the computer network by the MAC;

a retry counter reset signal generator responsive to assertion of the backpressure to generate a retry counter reset signal that resets the retry count to a start value; and programmable retry limit modification logic within the control logic that is configured to receive predetermined programmed information from an external switch engine and selectively modifies the retry limit value of the retry count based upon the predetermined programmed information in response to the assertion of backpressure by the MAC.

22. The arrangement according to claim 21, wherein the retry limit modification logic selectively modifies the retry limit value to establish a modified retry limit value based on whether a predetermined condition included in the predetermined programmed information is met.

23. The arrangement according to claim 22, wherein the programmable retry limit modification logic is configured to selectively modify the retry limit value according to a first modification when the predetermined condition is met and a second modification when the predetermined condition is not met.

24. The arrangement according to claim 23, wherein the first modification includes subtracting a current count value of the retry counter from a current retry limit value to establish the modified retry limit value and the second modification includes subtracting the current count value of the retry counter from the current retry limit value and adding a predetermined integer value determined according to the predetermined programmed information to establish the modified retry limit value.

25. The arrangement according to claim 23, wherein the second modification includes subtracting a current count value of the retry counter from a current retry limit value to establish the modified retry limit value and the first modification includes subtracting the current count value of the retry counter from the current retry limit value and adding a predetermined integer value determined according to the predetermined programmed information to establish the modified retry limit value.

26. The arrangement according to claim 22, wherein the control logic compares the modified retry limit value to a current count value of the retry counter to determine whether a maximum total number of transmission attempts has been reached.

27. The arrangement according to claim 26, wherein the control logic discards the data when the control logic determines that the maximum total number of transmission attempts has been reached.

28. The arrangement according to claim 26, wherein the retry limit modification logic sets the retry limit value to a retry limit start value when the control logic determines that the maximum total number of transmission attempts has been reached.

29. A method of controlling a number of attempts to transmit a data packet from a port of a network switch, comprising the steps of:

determining if a maximum number of attempts to transmit the data packet from the port of the network switch has been made upon an unsuccessful attempt to transmit the data packet;

selectively modifying the maximum number of attempts such that a total number of transfer attempts for the data packet does not exceed a maximal retry limit value determined based upon predetermined programmed information.

30. The method according to claim 29, wherein the predetermined programmed information is responsive to network switch conditions.

31. The method according to claim 29, wherein the predetermined programmed information is responsive to a priority of the data packet.

* * * * *